United States Patent [19]

Lenz et al.

[11] 3,919,405

[45] Nov. 11, 1975

[54] STABILIZATION OF ALKALI METAL AND/OR ALKALINE EARTH METAL HYDRIDES

[75] Inventors: Arnold Lenz, Cologne-Stammheim; Walter Rogler, Ranzel-Troisdorf, both of Germany

[73] Assignee: Dynamit Nobel Aktiengesellschaft, Troisdorf, Germany

[22] Filed: Nov. 26, 1971

[21] Appl. No.: 202,654

Related U.S. Application Data

[63] Continuation of Ser. No. 60,633, Aug. 3, 1970, abandoned, and a continuation-in-part of Ser. No. 730,942, May 21, 1968, abandoned.

[30] Foreign Application Priority Data

June 1, 1967 Germany................. 53214

[52] U.S. Cl.................. 423/646; 423/268
[51] Int. Cl.²........................... C01B 6/04
[58] Field of Search........... 423/646, 647, 268, 269; 252/182, 188, 384, 389; 117/100

[56] References Cited
UNITED STATES PATENTS

| | | | |
|---|---|---|---|
| 2,513,997 | 7/1950 | Gibb | 252/188 |
| 2,898,195 | 8/1959 | Banus | 423/646 |
| 3,222,288 | 12/1965 | Hansley et al. | 252/182 |
| 3,281,362 | 10/1966 | DiSapio | 117/100 X |
| 3,346,506 | 10/1967 | Beumol | 252/188 |
| 3,407,089 | 10/1968 | Sampson et al. | 117/100 |

*Primary Examiner*—G. O. Peters
*Attorney, Agent, or Firm*—Burgess, Dinklage & Sprung

[57] ABSTRACT

Process of stabilizing alkali and/or alkaline earth metal hydrides which comprises coating the particles of hydride by contacting them with a solution of liquid saturated hydrocarbons, boiling in the range from about 220° to 400°C, in saturated hydrocarbons, boiling in the range from about 20° to 160°C, and thereafter removing the solvent.

The resultant novel products, i.e., particles of hydride coated with said saturated hydrocarbons (b.p. about 220°–400°C) are stable, non-sticking and exist in the form of a free flowing powder. The ratio of hydrocarbon to hydride to give stability and flowability is dependent upon the hydride particle size.

3 Claims, No Drawings

STABILIZATION OF ALKALI METAL AND/OR ALKALINE EARTH METAL HYDRIDES

This is a continuation of application Ser. No. 60,633 filed Aug. 3, 1970, now abandoned.

This application is a continuation-in-part of our copending application Ser. No. 730,942, filed May 21, 1968, now abandoned.

This invention relates to the stabilization of alkali metal and alkaline earth metal hydrides. More particularly this invention relates to the stabilization of alkali and alkaline earth metal hydrides by coating the powdered hydride with liquid saturated hydrocarbons boiling in the range of from 220°–400°C.

The hydrides of the alkali metals and alkaline earth metals are known to be substances that are highly sensitive to air. Whereas the hydrides of the alkaline earth metals are only converted into alkaline earth metal hydroxides and hydrogen under the influence of atmospheric moisture, the hydrides of the alkali metals ignite merely on exposure to air.

The hydrides of the alkali and alkaline earth metals have to be stored, therefore, under the complete exclusion of moisture, and in the case of alkali metal hydrides, under the exclusion of atmospheric air. Storage under conditions ensuring the exclusion of moisture and atmospheric air is generally not difficult, as the hydrides can be packaged in suitable packings and satisfy the above requirements immediately after their manufacture. Difficulties, however, are often involved in their handling by the end-user, who, unlike the manufacturer, is usually not very proficient at putting into effect the necessary precautionary measures, this unfortunately being the case in most non-chemical enterprises. For this reason, the use of the alkali and alkaline earth metal hydrides has not been well established in spite of the fact that their cost might be attractive for many applications.

To avoid these problems associated with the metal hydrides, numerous attempts have been made to stabilize the hydrides particularly by applying a protective coating to the particles to seal them off against air, in order to thus permit their storage and easy handling, particularly in the end-user's establishment. Paraffin waxes, naphthalene, mineral oil, tar, Vaseline, synthetic resins and the like have been used in this connection as the coating material. It has also been proposed to coat the hydride with a mixture of a water-insoluble organic acid and a water-repellent solid substance, such as a hydrocarbon or ester, for example.

In the case of coating carried out with solids, the hydrides thus stabilized are often pressed into the form of solid cakes or pellets. This type or form of materials have the disadvantage, as regards the reactions in which they are to be used, that their reactivity is too greatly reduced by their excessively dense form. Moreover, the large amount of the coating and the insolubility of the coating in water or in solvents such as, for example alcohols, renders their use impractically slow and complicated, oftentimes necessitating a heating step for the sole purpose of melting or dissolving the coatings.

Consequently, thin paraffin oils often are preferred for use as the protective material. In the manufacture of preparations of this kind, the procedure, as a rule, is to prepare the hydrides of the alkali metals or alkaline earth metals by the hydrogenation of the metals dispersed in these oils. Fundamentally, however, it is also possible to suspend the prepared hydrides in the oil and the desired hydride-oil mixtures can be recovered by filtration. However, the final products contain excessively large amounts of paraffin oil, and furthermore they are very sticky and hard to handle. Also, they have the disadvantage of introducing unnecessary amounts of inert substances into the chemical process in which the hydride is to be used which substances interfere with that process as well as interfering with the use of the product of such process. This is also the case, of course, with solid protective coatings.

In the case of applications in chemical processes, in place of the paraffin oil-moist hydrides just mentioned, it is possible to use suspensions of the metal hydrides in paraffin oils. These suspensions are fairly fluid, but as a rule they contain about 70 to 80%, by weight, of the paraffin oil in which the presence of the paraffin oil and its effects both on the process in which the hydride is to be used and on the product of such process will be even more undesirable.

It is an object of the present invention to provide an advantageous, simple and very effective process of stabilizing alkali metal and alkaline earth metal hydrides.

Another object of the invention is to provide an improved stabilized alkali metal and alkaline earth metal hydride.

Still another object of the invention is to provide an improved process of stabilizing alkali metal and alkaline earth metal hydrides by applying to them an air and moisture impervious coating which does not interfere with or complicate their subsequent use.

Other objects of the invention will, in part, be obvious and will in part appear hereinafter.

In accordance with the invention, it has now been found alkali metal hydrides and/or alkaline earth metal hydrides can be stabilized by coating the particles of these materials with liquid, saturated hydrocarbons having a boiling range from about 220° to 400°C, and preferably from about 280° to 320°C. The ratio of the coating to hydride is dependent upon the particle size of the hydride and, to give a flowable powder product, the amount of hydride on a weight basis for each part of the coating hydrocarbon is approximately 40% of the numerical value of the hydride particle size, expressed in microns.

The process of the invention is characterized in that the hydride in powder form is moistened with a solution of one coating hydrocarbon in a solvent comprising saturated hydrocarbons boiling in the range between about 20° and 160°C, and thereafter removing the solvent by evaporation.

The alkali metal and alkaline earth metal hydrides which can be stabilized by the process in accordance with the invention include, for example, sodium hydride, potassium hydride, lithium hydride, calcium hydride, magnesium hydride, barium hydride, etc.

The specific surface area of the hydride powder involved is critical with respect to the difficulties involved in its handling. Thus below a particle size of approximately 100μ, sodium hydride ignites spontaneously on any contact with atmospheric air. In accordance with the invention, it has been established that a certain relationship of the liquid hydrocarbon used for the coating to powdery hydride must be observed depending on the specific surface area of the hydride involved. The approximately 40% relationship referred to above is set out in the following Table as well as in the examples hereinafter:

TABLE

| SIZE OF HYDRIDE PARTICLES IN MICRONS | APPROXIMATE PROPORTIONS OF HYDRIDE PER PARTS BY WEIGHT OF HYDROCARBON COATING |
|---|---|
| 5 | 2 |
| 10 | 4 |
| 50 | 20 |
| 100 | 40 |

Straight chain hydrocarbon compounds, such as pentane, hexane, heptane, octane and decalin, can be used, for example, as saturated hydrocarbon solvents which boil in the range of about 20° to 160°C. However, cycloaliphatics, such as cyclohexane or cycloheptane, are also suitable as solvents or diluents for the higher boiling saturated hydrocarbons used as coating materials for the hydrides. In addition, the benzines boiling between about 20° and 160°C can be used to special advantage as solvents for the higher boiling hydrocarbons.

In accordance with the process of the invention, the moistening of the hydride with the hydrocarbon solution can be carried out by applying the hydrocarbon solution to the hydride by means of a spray nozzle while the hydride is suspended in a fluidized bed, for example. The low boiling saturated hydrocarbons are then evaporated off by heating, if desired, with reduction of pressure.

In the last-described embodiment of the invention it is advantageous if the concentration of the higher boiling hydrocarbons in the solvent is relatively high. In this case, a high degree of moistening is not required, and an unnecessarily long distillation of a large amount of low boiling hydrocarbons can be avoided. The concentration of the higher boiling hydrocarbons in the solvent is limited, however, by the viscosity of the solution which should not be too high to permit uniform coating. The viscosity, of course, can be further reduced by heating. The viscosity of the solution contacting the hydride should be about 10 to 150 poises and probably about 10 to 70 poises.

The concentration of the high boiling hydrocarbons in the solution can be made substantially lower in the case of the fluidized-bed suspension referred to above, and then the low boiling solvent can be distilled out of the suspension. It is possible in this manner where the starting mixture is correctly proportioned, to arrive at the desired non-sticky liquid hydrocarbon coated metal hydrides.

The product achieved by the process of the invention is characterized by an extraordinarily fine coating of the liquid hydrocarbons, the same sufficing to provide effective protection against air and during the handling of the material in the course of its application. The bulk weight of the coated metal hydride amounts to about 0.78 to 0.80 grams per cc. Most surprisingly, the metal hydride so coated is so non-sticking that it is practically in the form of a freeflowing powder. When the metal hydride is used in chemical processes, the coating is easily and readily removable, as the liquid paraffin floats to the surface in aqueous reaction media and dissolves easily where the reaction medium is an organic solvent, and there is so little of it that its presence does not al all constitute a problem.

The following Examples are given for the purpose of illustrating the invention, but are in nowise to be construed as a limitation thereof. All parts are by weight unless otherwise specified.

EXAMPLE 1 a. 80 kg of sodium hydride powder (fineness 10 microns) were placed in a vessel provided with a side-scraping agitator. A mixture of 60 kg of benzine having a boiling range of 80° to 100°C and 20 kg of paraffin oil having a boiling range of 280° to 320°C was then added, the entire mixture being kept under agitation. The mixture was then continued to be agitated for 5 minutes while at the same time air was excluded by covering the reaction mixture with hydrogen. In this manner a suspension of sodium hydride, benzine and oil was produced, having a hydride content of 50 wt-%. This mixture was then heated to about 80°C. while continuing to pass small amounts of hydrogen through the space over the surface of the liquid inside the vessel. Distillation of the benzine was thereby begun and its removal completed by a slow temperature rise to 110°C. The end product was a white, non-sticking flowable powder which contained 80% sodium hydride and 20 % paraffin oil, which did not ignite upon contact with atmospheric air, and which had a specific gravity of about 1.0 and a bulkweight of about 0.8.

b. Since it is known that sodium tertiary butylate cannot readily be produced directly from tertiary butanol using metallic sodium, sodium hydride is used to effect the reaction quantitatively and favorably. 58 g of the sodium hydride powder produced in (a) were mixed with 1 liter of tertiary butanol for the formation of sodium tertiary butylate. Hydrogen evolution set in immediately at the rate of 90 liters per hour. After about one-half hour the reaction was completed.

c. The process of (b) was repeated except that instead of sodium hydride coated with paraffin oil there was used 58 grams of sodium hydride coated with solid paraffin wax in the same manner and proportion as in (a). The reaction proceeded much more slowly, hydrogen being evolved at the rate of 40 liters per hour.

d. Unreacted butanol in (b) and (c) was removed from the conversion products by evaporation, and afterwards the coating agent of the sodium hydride was removed in each case by extraction with benzine. The extraction time necessary for the complete removal of the paraffin of (c) was a little more than twice as long as for removal of the paraffin oil of (b).

EXAMPLE 2

In the same vessel as in Example 1, 80 kg of calcium hydride powder, 60 kg of benzine (boiling range 80° to 110°C) and 20 kg of paraffin oil (boiling range 280° to 320°C) were mixed together under a hydrogen atmosphere. The suspension thus created was freed from the benzine by distillation in the same manner as described in Example 1. For the sake of completeness, toward the end distillation was carried out for a brief period under a vacuum. The non-sticking powder than developed was stable on contact with air even when exposed for prolonged periods.

EXAMPLE 3

1 kg barium hydride powder (fineness 15μ) were introduced into a vessel provided with a side-scraping agitator. A mixture of 0.25 kg paraffin oil (boiling range 280°–320°C) and 0.75 kg benzine were thereafter introduced under agitation. The mixture was maintained under agitation while at the same time the air present in the vessel was scavenged by covering the reaction mixture with hydrogen. After only a short period of time had elapsed a homogeneous barium-hydride-paraffin oil-benzine suspension was obtained having a hydride content amounting to 50% by weight. The mixture was then heated up to about 80°C. Distillation of the benzine was started up and completed by a slow temperature increase to 110°C.

The end product was a bluish-white non-sticking powder which contained 80% barium hydride and 20% paraffin oil and which did not ignite upon contact with atmospheric air.

EXAMPLE 4

1 kg lithium hydride powder (fineness $10\mu$) was suspended as described in Example 3 in a mixture of 0.25 kg of paraffin oil (boiling range 280°–320°C) and 0.75 kg of benzine (boiling range 80°–110°C). The suspension was further treated as described in Example 3. Following distillation for removal of the benzine, a white non-sticking powder was obtained which did not ignite upon contact with atmospheric air and which contained 80% lithium hydride and 20% paraffin oil.

It will be appreciated that the instant specification and examples are set forth by way of illustration and not limitation, and that various modifications and changes may be made without departing from the spirit and scope of the present invention.

What is claimed is:

1. A process of stabilizing an alkali metal or alkaline earth metal hydride having a particle size up to about 100 microns against degradation by air or atmospheric moisture comprising admixing said hydride with a solution of a high-boiling liquid saturated hydrocarbon boiling in the range of about 220° to 400°C. and, as a solvent therefor, a lower boiling hydrocarbon boiling in the range of 20° to 160°, and thereafter removing said solvent, leaving said high-boiling liquid saturated hydrocarbon as a coating on the particles of said hydride, the amount of hydride so admixed with each part by weight of said high-boiling hydrocarbon being approximately 40% of the numerical value of the particle size of said hydride, expressed in microns.

2. The process of claim 1 wherein said high-boiling liquid saturated hydrocarbon is a paraffin boiling in the range of about 280° to 320°C.

3. A flowable hydride powder stabilized against degradation by contact with air and atmospheric moisture comprising an hydride in powder form, having a particle size up to about 100 microns of metal selected from the group consisting of alkali and alkaline earth metals uniformly coated with a liquid saturated hydrocarbon boiling in the range of about 220° to 400°C., the amount of hydride coated with each part by weight of said hydrocarbon being approximately 40% of the numerical value of the particle size of said hydride, expressed in microns.

* * * * *